3,080,403
BORON COMPOUNDS
Donald D. Emrick, Shaker Heights, Ohio, assignor to The Standard Oil Company, Cleveland, Ohio, a corporation of Ohio
No Drawing. Filed Dec. 30, 1960, Ser. No. 79,538
5 Claims. (Cl. 260—404)

This invention relates to novel boron compounds. More particularly, this invention relates to a class of boron compounds which may find use as additives for motor fuel, fuel oil, and lubricating oil compositions..

The boron compounds of this invention are prepared by reacting boric acid or boric oxide with an N-acylated amino hydroxy compound having the following general formula:

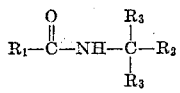

wherein $R_1$ represents a radical selected from a group consisting of an alkyl, alkenyl, or arylalkyl radical containing 7 to 21 carbon atoms, $R_2$ represents the radical —$(CH_2)_nOH$ where $n$ is a small whole number such as 1 to 3, and $R_3$ represents a radical selected from the group consisting of $R_2$ or an alkyl radical containing 1 to 8 carbon atoms where $R_3$ may be same or different for the two positions of $R_3$ on the molecule.

When both positions of $R_3$ are the same as $R_2$, the boron compounds will have the general structure:

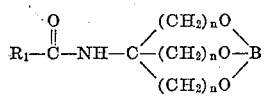

When one position for $R_3$ is the same as $R_2$ and the other position for $R_3$ is an alkyl radical, the boron compounds will have the general structure:

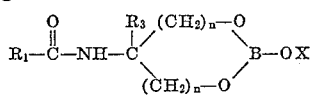

where X is hydrogen or

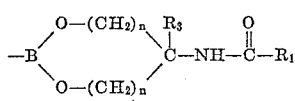

When both positions for $R_3$ are alkyl radicals, the boron compounds will have the general structure:

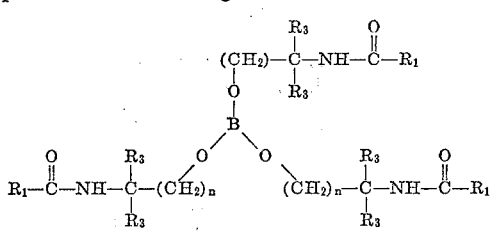

The above-mentioned class of boron compounds have been found to be excellent multi-functional additives for motor fuel when one or more of the same are incorporated therein in only small amounts. In common with other boron-containing compounds, these materials are highly effective in controlling troublesome conditions caused by deposit buildup in the combustion chamber of an internal combustion engine.

The amount of boron compound or compounds to be used in motor fuel may vary. Generally the smallest amount that will give significant results will be in the order of 0.001% by weight. Amounts greater than approximately 1% by weight usually cannot be justified economically.

The amount of boron compound to be added to the lubricating composition may vary. Best results are obtained when amounts of at least 1% by weight are used. Amounts greater than 10% will usually not be justified economically.

The N-acylated amino hydroxy compounds used in preparing the boron compounds of this invention may be prepared from amino hydroxy compounds containing a primary or secondary amine functional group by the N-acylation of the amine group of the compound with a long-chain acid or acid-chloride containing from 8 to 22 carbon atoms, and such materials are well known in the trade and are commercially available.

Any of the compounds having the general formula offered hereinbefore are suitable for the invention. The preferred compounds, however, are the N-acylation products of amino dihydroxy compounds so that one position for $R_3$ is the same as $R_2$ and the other position for $R_3$ is an alkyl radical, and where $R_1$ as defined heretofore contains from 11 to 17 carbon atoms for maximum solubility in the liquid hydrocarbon. The amino dihydroxy compounds are preferred since they are more readily soluble in hydrocarbons than are the amino trihydroxy compounds where $R_3$ for both positions on the molecule are the same as $R_2$ and because the amino dihydroxy compounds such as of the type derived from 2-amino-2-alkylpropanediol-1,3 form a six-membered ring upon boration with boric acid or boric oxide which is believed to offer optimum stability toward hydrolysis. Mixtures of the amino hydroxy compounds may be used. Mixtures of radicals may also be used for $R_1$, and this frequently will be the case since the $R_1$ radicals are preferably derived from fatty acids found in naturally occurring fats and oils, and hence, $R_1$ will correspond to the fatty acid radicals derived from fats and oils such as tallow, cottonseed oil, soybean oil, tall oil, etc. The nature of $R_1$ does not affect the results appreciably, it has been found, and therefore its selection will be dictated largely by economics. The commercial grade of the compounds, including small amounts of impurities or by-products, are suitable. A particularly desirable starting compound for purposes of the invention is the N-oleoylamide of 2-amino-2-methylpropanediol-1,3:

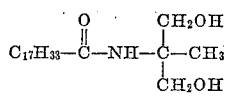

These N-acylated amino hydroxy compounds readily undergo reaction with boric acid under conditions in which the water of reaction may be removed from the reaction mixture as it is formed. This removal of water may be accomplished by simple boiling, but it is preferable to remove the water by means of azeotropic fractional distillation using, preferably, benzene or toluene as the solvent. Boric oxide may be used in place of boric acid as the boron source in these reactions with only the requirement for making the appropriate weight adjustment in order to maintain the molar relationship with the N-acylated amino hydroxy compounds.

The preparation of these compounds will be better understood in connection with the following examples:

*Example 1*

74.4 grams of N-oleoylamide of 2-amino-2-methyl propanediol-1,3 was placed in a flask with 12.4 grams boric acid (a 1:1 molar ratio) and 120 milliliters (ml.) of benzene. The mixture was stirred and refluxed together until 7.3 ml. of water was azeotropically distilled off overhead. The reaction mixture was then filtered and the filtrate evaporated down to produce a transparent plastic material which was readily soluble in gasoline. The reaction proceeds in accordance with the following equation:

$$C_{17}H_{33}-\overset{O}{\underset{\|}{C}}-NH-\underset{CH_2OH}{\overset{CH_3}{C}}\!\!\diagdown\!\!^{CH_2OH} + H_3BO_3 \longrightarrow$$

$$C_{17}H_{33}-\overset{O}{\underset{\|}{C}}-NH-\underset{CH_2-O}{\overset{CH_3}{C}}\!\!\diagdown\!\!^{CH_2-O}\!\!\diagdown\!\!B-OH + 2H_2O$$

Example 2

To 74.2 grams of N-stearoylamide of 2-amino-2-methyl-propanediol-1,3 contained in a flask was added 300 grams of benzene and 12.4 grams of boric acid (a 2:2 molar ratio). The mixture was refluxed together for several hours until 8.0 ml. of water was azeotropically distilled off overhead. The remainder of the benzene was then distilled off, leaving a plastic solid which was readily soluble in gasoline. The reaction may be represented by the following equation:

$$2C_{17}H_{33}-\overset{O}{\underset{\|}{C}}-NH-\underset{CH_2OH}{\overset{CH_3}{C}}\!\!\diagdown\!\!^{CH_2OH} + 2H_3BO_3 \longrightarrow C_{17}H_{33}-\overset{O}{\underset{\|}{C}}-NH-\overset{CH_3}{C}\!\!\diagup\!\!^{CH_2-O}\!\!\diagdown_{CH_2-O}\!\!B-O-B\!\!\diagup^{O-CH_2}\!\!\diagdown_{O-CH_2}\overset{CH_3}{C}-NH-\overset{O}{\underset{\|}{C}}-C_{17}H_{33} + 5H_2O$$

Example 3

105.9 grams of the N-oleoylamide of 2-amino-2,2-dimethyl propanol was placed in a flask with 6.2 grams of boric acid (3:1 molar ratio) and 300 ml. of benzene. The mixture was stirred and refluxed together until 5.4 ml. of water was azeotropically distilled off overhead. The remaining benzene was then distilled off, leaving a plastic product readily soluble in gasoline. The reaction proceeds as follows:

$$3C_{17}H_{33}-\overset{O}{\underset{\|}{C}}-NH-\underset{CH_2OH}{\overset{CH_3}{\underset{|}{C}}}-CH_3 + H_3BO_3 \longrightarrow \text{(tri-ester product)} + 3H_2O$$

Example 4

38.5 grams of the N-oleoylamide of tris(hydroxymethyl) aminomethane was dissolved in 300 ml. of benzene. 6.2 grams of boric acid was then added (a 1:1 molar ratio) and the mixture was refluxed at the azeotropic distillation temperature for the removal of the theoretical amount of water with benzene overhead. The remainder of the benzene was distilled off. The reaction proceeds according to the following equation:

$$C_{17}H_{33}-\overset{O}{\underset{\|}{C}}-NH-\underset{CH_2OH}{\overset{CH_2OH}{C}}\!\!-\!CH_2OH + H_3BO_3 \longrightarrow$$

$$C_{17}H_{33}-\overset{O}{\underset{\|}{C}}-NH-C\!\!\diagup\!\!^{CH_2-O}\!\!\diagdown_{CH_2-O}\!\!\!-\!\!\underset{CH_2-O}{}B + 3H_2O$$

Example 5

20.7 grams of the n-phenylacetylamide of 2-amino-2-methylpropanediol-1,3 was placed in a flask with 12.4 grams of boric acid (a 1:1 molar ratio). The mixture was refluxed until 3.6 ml. of water was azeotropically distilled off overhead as an azeotrope with benzene. The remainder of the benzene in the flask was then distilled off, leaving a white solid which was moderately soluble in gasoline. The reaction that took place may be represented by the following equation:

$$\text{Ph}-CH_2-\overset{O}{\underset{\|}{C}}-\overset{H}{\underset{|}{N}}-\underset{CH_2OH}{\overset{CH_3}{\underset{|}{C}}}-CH_2OH + H_3BO_3 \longrightarrow$$

$$\text{Ph}-CH_2-\overset{O}{\underset{\|}{C}}-\overset{H}{\underset{|}{N}}-\overset{CH_3}{\underset{|}{C}}\!\!\diagup\!\!^{CH_2-O}\!\!\diagdown_{CH_2-O}\!\!B-OH + 2H_2O$$

As stated heretofore, the boron compounds of this invention are stable toward hydrolysis and particularly so when dissolved in gasoline.

This application is a continuation-in-part of my application Serial No. 836,948, filed August 31, 1959, now U.S. Patent 3,009,791, issued November 21, 1961, in which there was a requirement for restriction and in which the following claims were not elected.

I claim:
1. A boron compound selected from the group consisting of:

$$R_1-\overset{O}{\underset{\|}{C}}-NH-\overset{R_3}{\underset{}{C}}\!\!\diagup\!\!^{(CH_2)_n-O}\!\!\diagdown_{(CH_2)_n-O}\!\!B-OX$$

where X is selected from the group consisting of hydrogen and (1)

$$\begin{array}{c} CH_2-\overset{CH_3}{\underset{|}{C}}-NH-\overset{O}{\underset{\|}{C}}-C_{17}H_{33} \\ O \quad CH_3 \\ | \\ B \\ \diagup \quad \diagdown \\ \end{array}$$

(2)

$$-B\!\!\diagup\!\!^{O-(CH_2)_n}\!\!\diagdown_{O-(CH_2)_n}\!\!\overset{R_3}{\underset{}{C}}-NH-\overset{O}{\underset{\|}{C}}-R_1$$

$$R_1-\overset{O}{\underset{\|}{C}}-NH-\overset{(CH_2)_nO}{\underset{(CH_2)_nO}{C}}\!\!\!-\!\!B$$

and (3)

$$\begin{array}{c} (CH_2)_n-\overset{R_3}{\underset{|}{C}}-NH-\overset{O}{\underset{\|}{C}}-R_1 \\ | \\ R_3 \\ B \\ \end{array}$$

$$R_1-\overset{O}{\underset{\|}{C}}-NH-\overset{R_3}{\underset{R_3}{C}}-(CH_2)_n \quad (CH_2)_n-\overset{R_3}{\underset{R_3}{C}}-NH-\overset{O}{\underset{\|}{C}}-R_1$$

wherein $R_1$ represents a radical selected from the group consisting of an alkyl, alkenyl, and arylalkyl radical containing 7 to 21 carbon atoms, $n$ is a small whole number from 1 to 3, and $R_3$ where present for one position on the molecule, represents an alkyl radical containing 1 to 8 carbon atoms and when present for more than one position on the molecule the $R_3$'s represent members selected from the group consisting of the same and different alkyl radicals containing 1 to 8 carbon atoms.

2. A new compound having the formula:

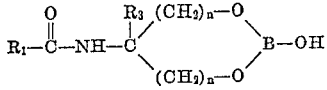

wherein $R_1$ represents a radical selected from the group consisting of an alkyl, alkenyl, and arylalkyl radical containing 7 to 21 carbon atoms, $n$ is a small whole number from 1 to 3, and $R_3$ represents an alkyl radical containing 1 to 8 carbon atoms.

3. A new compound having the formula:

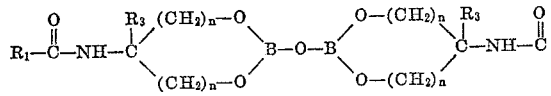

wherein $R_1$ represents a radical selected from the group consisting of an alkyl, alkenyl, and arylalkyl radical containing 7 to 21 carbon atoms, $n$ is a small whole number from 1 to 3, and $R_3$ represents an alkyl radical containing 1 to 8 carbon atoms.

4. A new compound having the formula:

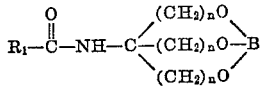

wherein $R_1$ represents a radical selected from the group consisting of an alkyl, alkenyl, and arylalkyl radical containing 7 to 21 carbon atoms and $n$ is a small whole number from 1 to 3.

5. A new compound having the formula:

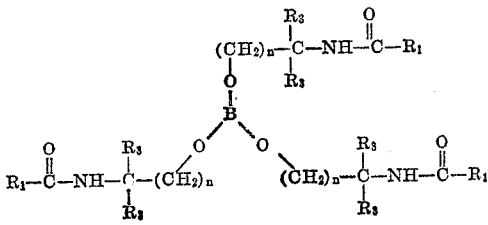

wherein $R_1$ represents a radical selected from the group consisting of an alkyl, alkenyl, and arylalkyl radical containing 7 to 21 carbon atoms, $n$ is a small whole number from 1 to 3, and the $R_3$'s represent members selected from the group consisting of the same and different alkyl radicals containing 1 to 8 carbon atoms.

References Cited in the file of this patent
UNITED STATES PATENTS

| | | |
|---|---|---|
| 2,052,192 | Pigott | Aug. 25, 1936 |
| 2,441,063 | Gillman | May 4, 1948 |

UNITED STATES PATENT OFFICE
CERTIFICATE OF CORRECTION

Patent No. 3,080,403                                          March 5, 1963

Donald D. Emrick

It is hereby certified that error appears in the above numbered patent requiring correction and that the said Letters Patent should read as corrected below.

Column 1, lines 51 to 59, the formula should appear as shown below instead of as in the patent:

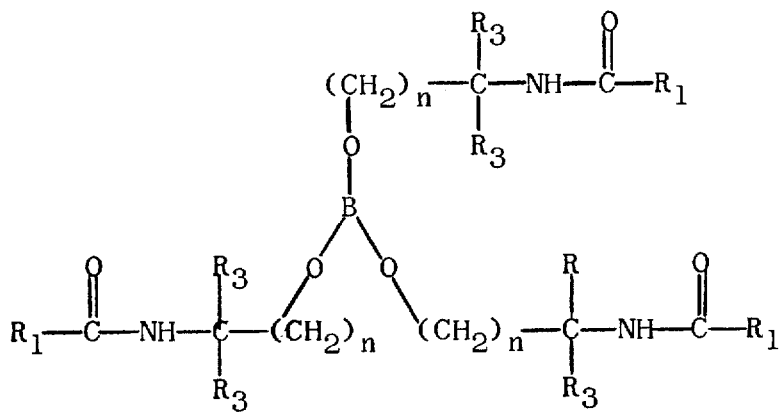

columns 3 and 4, lines 22 to 28, the formula should appear as shown below instead of as in the patent:

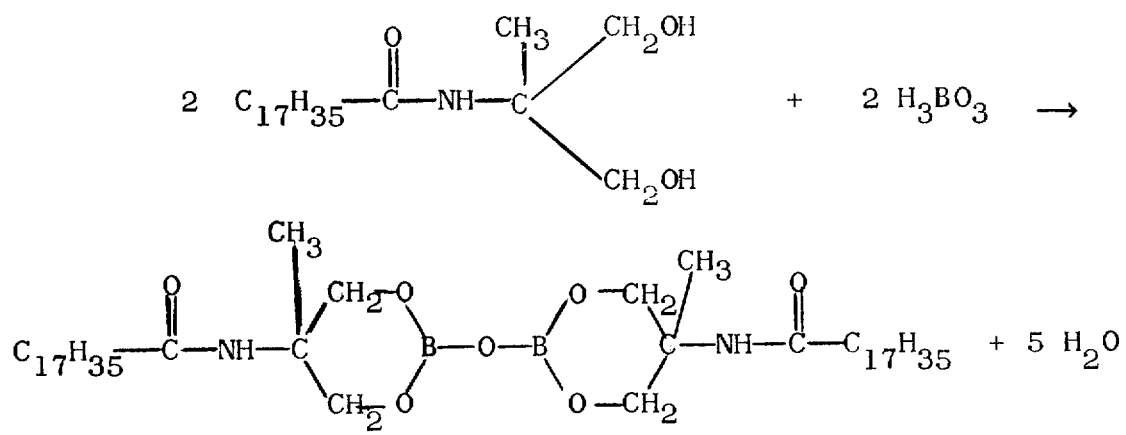

column 5, lines 16 to 19, the formula should appear as shown below instead of as in the patent:

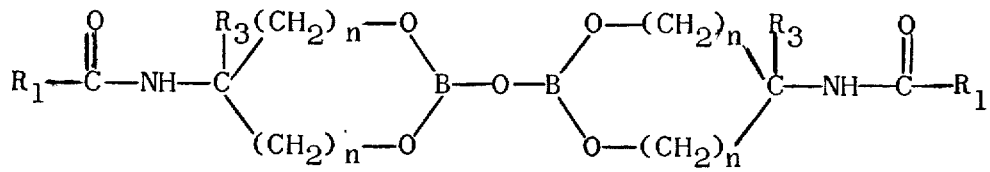

Signed and sealed this 24th day of December 1963.

(SEAL)
Attest:
ERNEST W. SWIDER

Attesting Officer

EDWIN L. REYNOLDS
Acting Commissioner of Patents